(12) United States Patent
Hong et al.

(10) Patent No.: US 12,451,736 B2
(45) Date of Patent: Oct. 21, 2025

(54) METHOD AND APPARATUS FOR INDICATING MEASUREMENT, AND METHOD AND APPARATUS FOR RECEIVING INDICATION

(71) Applicant: Beijing Xiaomi Mobile Software Co., Ltd., Beijing (CN)

(72) Inventors: Wei Hong, Beijing (CN); Ming Zhang, Beijing (CN)

(73) Assignee: Beijing Xiaomi Mobile Software Co. Ltd., Beijing (CN)

( * ) Notice: Subject to any disclaimer, the term of this patent is extended or adjusted under 35 U.S.C. 154(b) by 69 days.

(21) Appl. No.: 18/562,631

(22) PCT Filed: May 21, 2021

(86) PCT No.: PCT/CN2021/095296
§ 371 (c)(1),
(2) Date: Nov. 20, 2023

(87) PCT Pub. No.: WO2022/241779
PCT Pub. Date: Nov. 24, 2022

(65) Prior Publication Data
US 2024/0243619 A1    Jul. 18, 2024

(51) Int. Cl.
*H02J 50/80* (2016.01)
*H04W 24/10* (2009.01)

(52) U.S. Cl.
CPC ............ *H02J 50/80* (2016.02); *H04W 24/10* (2013.01)

(58) Field of Classification Search
CPC ........................................................ H02J 50/80
USPC ........................................................... 307/104
See application file for complete search history.

(56) References Cited

U.S. PATENT DOCUMENTS

| | | |
|---|---|---|
| 2015/0288423 A1 | 10/2015 | Chu |
| 2017/0317520 A1 | 11/2017 | Maguire |
| 2019/0363843 A1 | 11/2019 | Gordaychik |
| 2021/0167638 A1* | 6/2021 | Yahagi .................... H02J 50/40 |
| 2022/0141693 A1* | 5/2022 | Seo ....................... H04L 5/0023 |
| | | 370/252 |

FOREIGN PATENT DOCUMENTS

| | | |
|---|---|---|
| CN | 107040026 A | 8/2017 |
| CN | 108134439 A | 6/2018 |
| CN | 108401513 A | 8/2018 |
| WO | WO 2014/114002 A1 | 7/2014 |

OTHER PUBLICATIONS

International Search Report issued Feb. 16, 2022 in PCT/CN2021/095296, filed on May 21, 2021, 4 pages (with English Translation).
Extended European Search Report issued Feb. 17, 2025, in corresponding European Patent Application No. 21940232.8, 11 pages.

* cited by examiner

*Primary Examiner* — Joseph Chang
(74) *Attorney, Agent, or Firm* — Oblon, McClelland, Maier &Neustadt, L.L.P.

(57) ABSTRACT

The present disclosure relates to a method and an apparatus for indicating a measurement, and a method and an apparatus for receiving an indication. The method for indicating the measurement, performed by a first base station, includes sending indication information to a terminal, wherein the indication information is configured to instruct the terminal to measure wireless charging ability information of at least one second base station.

19 Claims, 9 Drawing Sheets

Indication information is sent to a terminal, the indication information being configured to instruct the terminal to measure wireless charging ability information of an other base station — S101

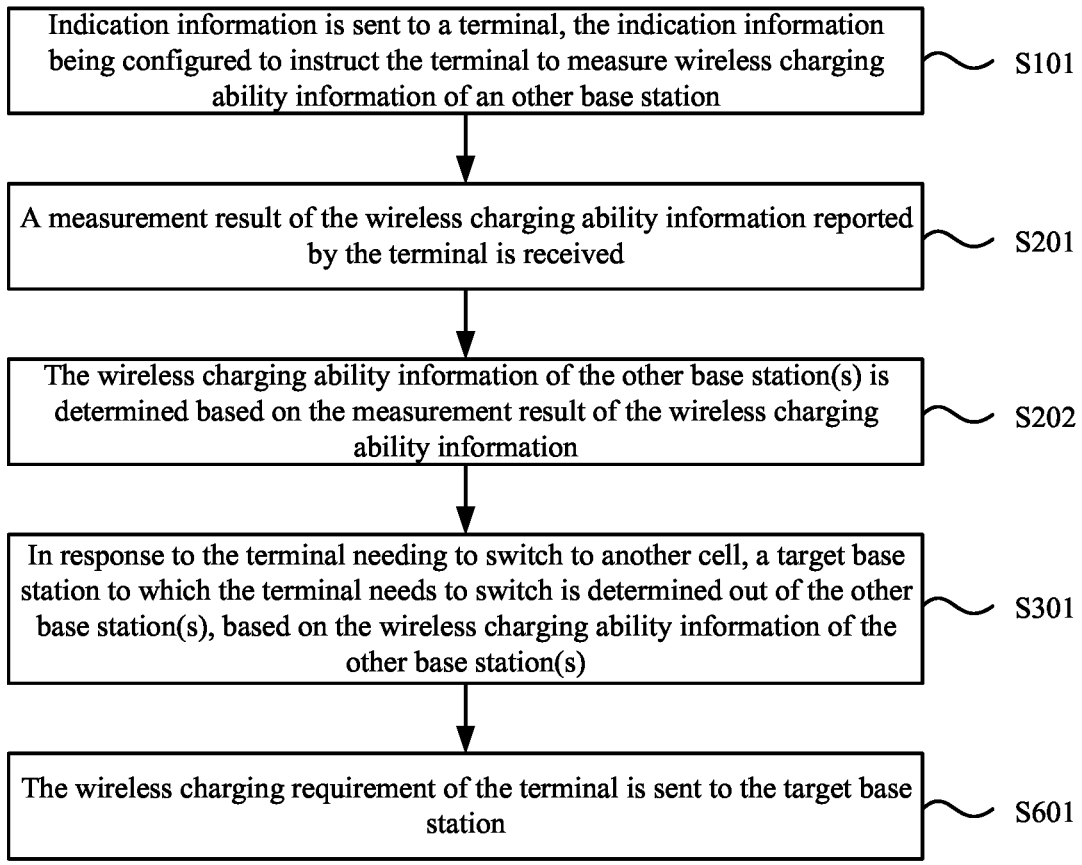
FIG. 6
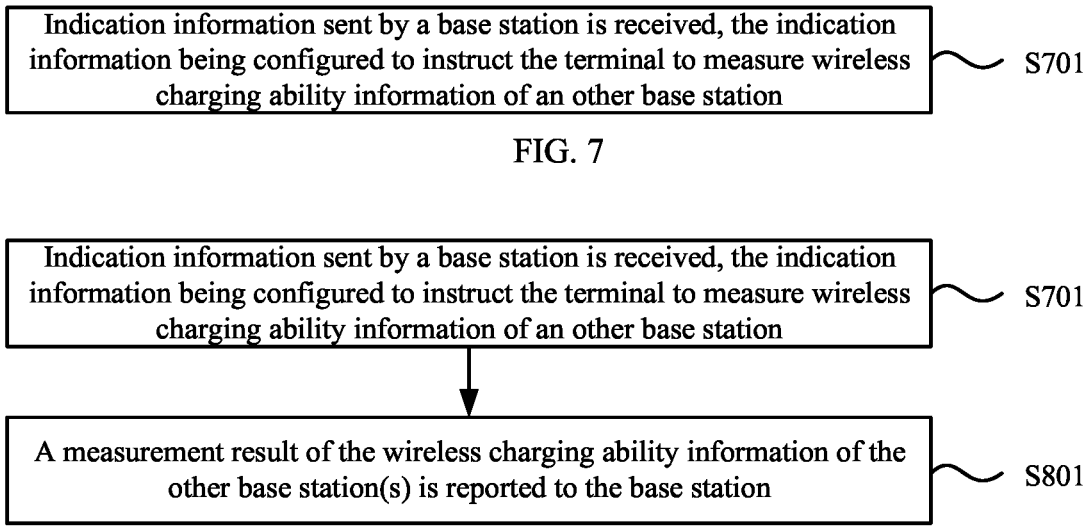
FIG. 7
FIG. 8

METHOD AND APPARATUS FOR INDICATING MEASUREMENT, AND METHOD AND APPARATUS FOR RECEIVING INDICATION

CROSS REFERENCE TO RELATED APPLICATIONS

The present disclosure is the U.S. national phase application of International Application No. PCT/CN2021/095296 filed on May 21, 2021, the content of which is incorporated herein by reference in its entirety for all purposes.

BACKGROUND

Technical Field

The present disclosure relates to the field of communication technology, in particular to a method for indicating a measurement, a method for receiving an indication, an apparatus for indicating a measurement, an apparatus for receiving an indication, a communication device, and a computer-readable storage medium.

Description of the Related Art

With the development of cellular mobile communication technology, especially millimeter wave communication technology, a base station can be configured with more and more antennas. For example, the Massive MIMO (Multiple Input Multiple Output) technology in 5G requires a large quantity of antennas to implement. Based on the large quantity of antennas, some base stations can also provide wireless charging services for terminals.

SUMMARY

According to a first aspect of the present disclosure, a method for indicating a measurement is provided. The method is applied to a base station, and includes sending indication information to a terminal, wherein the indication information is configured to instruct the terminal to measure wireless charging ability information of an other base station.

According to a second aspect of the present disclosure, a method for receiving an indication. The method is applied to a terminal, and includes receiving indication information sent by a base station, wherein the indication information is configured to instruct the terminal to measure wireless charging ability information of an other base station.

According to a third aspect of the present disclosure, an apparatus for indicating a measurement is provided. The apparatus is applied to a base station, and includes: an indication sending module configured to send indication information to a terminal, wherein the indication information is configured to instruct the terminal to measure wireless charging ability information of an other base station.

According to a fourth aspect of the present disclosure, an apparatus for receiving an indication is provided. The apparatus is applied to a terminal, and includes: an indication receiving module configured to receive indication information sent by a base station, wherein the indication information is configured to instruct the terminal to measure wireless charging ability information of an other base station.

According to a fifth aspect of the present disclosure, a communication device is provided, which includes a processor and a memory for storing a computer program. The processor is configured to implement the above method for indicating the measurement.

According to a sixth aspect of the present disclosure, a communication device is provided, which includes a processor and a memory for storing a computer program. The processor is configured to implement the above method for receiving the indication.

According to a seventh aspect of the present disclosure, a non-transitory computer-readable storage medium is provided, which is configured for storing a computer program, and when the computer program is executed by a processor, the above method for indicating the measurement is implemented.

According to an eighth aspect of the present disclosure, a computer readable storage medium is provided, which is configured for storing a computer program, and when the computer program is executed by a processor, the above method for receiving the indication is implemented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a schematic flowchart of a method for indicating a measurement according to some embodiments of the present disclosure.

FIG. 7 is a schematic flowchart of a method for receiving an indication according to some embodiments of the present disclosure.

FIG. 8 is a schematic flowchart of a method for receiving an indication according to some embodiments of the present disclosure.

DETAILED DESCRIPTION OF THE PREFERRED EMBODIMENTS

Figure 1:
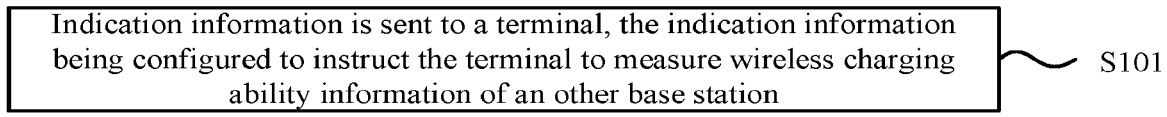
FIG. 1 is a schematic flowchart of a method for indicating a measurement according to some embodiments of the present disclosure.

Referring now to the drawings, wherein like reference numerals designate identical or corresponding parts throughout the several views.

A clear and complete description of technical solutions in embodiments of the present disclosure will be provided in the following in conjunction with the drawings. It is evident that the embodiments described are only a part of embodiments of the present disclosure, not all of them. Based on the embodiments of the present disclosure, all other embodiments obtained by those of ordinary skill in the art without creative efforts fall within the protection scope of the present disclosure.

Terms used in embodiments disclosed in the present disclosure are for the purpose of description of specific embodiments only, and are not intended to limit the embodiments of the present disclosure. Singular forms such as "a" and "the" used in embodiments of the present disclosure and the attached claims are also intended to include plural forms, unless other meanings are clearly indicated in the context. It should also be understood that the term "and/or" used herein refers to and includes any or all possible combinations of one or more related items listed.

It should be understood that although terms such as first, second, and third may be used to describe various information in embodiments of the present disclosure, such information should not be limited to these terms, which are only used to distinguish information of the same type from each other. For example, without departing from the scope of the present disclosure, the first information can also be referred to as the second information, and similarly, the second information can also be referred to as the first information. The word "if" used herein can be interpreted as "when" or "while" or "in response to determination that", depending on the context.

For the purpose of simplicity and ease of understanding, terms used in herein to represent a size relationship are "greater than" or "less than", "higher than" or "lower than". But for those skilled in the art, it can be understood that the term "greater than" also covers the meaning of "greater than or equal to", "less than" also covers the meaning of "less than or equal to", the term "higher than" also covers the meaning of "higher than or equal to", and "lower than" also covers the meaning of "lower than or equal to".

FIG. 1 is a schematic flowchart of a method for indicating a measurement according to some embodiments of the present disclosure. The method for indicating the measurement shown in embodiments can be applied to a base station, which can communicate with a terminal used as a user device or communicate with a core network.

The terminal includes but is not limited to a communication device such as a mobile phone, a tablet, a wearable device, a sensor, an IoT device, etc. The base station includes but is not limited to a base station in the communication system such as 4G base station, 5G base station, 6G base station, etc.

In some embodiments, the base station can be other base stations corresponding to a cell where the terminal is located currently. It should be noted that in all embodiments of the present disclosure, wireless charging refers to the wireless charging of the terminal performed by the base station. The manner in which the wireless charging is performed includes at least one of electromagnetic induction, electromagnetic resonance, and wireless radio frequency.

In some embodiments, the base station charges the terminal in the manner of the wireless radio frequency, which can perform charging across the space. In some embodiments, the charging across the space refers to the ability of the base station to transmit energy in the manner of the millimeter wave and the narrow bandwidth to the terminal through multiple antennas. The terminal can receive energy through micro beacon antennas, which are then converted into electrical energy to achieve charging. The base station has the ability of charging across the space, which can further mean that the base station is able to determine a position of the terminal and transmit energy to the terminal at that position for charging.

As shown in FIG. 1, the method for indicating the measurement can include following steps.

In step S101, indication information is sent to a terminal, the indication information being configured to instruct the terminal to measure wireless charging ability information of an other base station.

In some embodiments, the base station can instruct the terminal to measure the wireless charging ability information of an other base station by sending indication information to the terminal, which is conductive for the base station to control the measurement performed by the terminal.

In some embodiments, instructing the terminal to measure the other base station can include measuring a neighboring base station of the base station, or base stations other than the neighboring base station, which can be provided according to needs.

In some embodiments, the measured wireless charging ability information includes but is not limited to a wireless charging power, a frequency domain resource for wireless charging, a time domain resource for wireless charging, etc.

In some embodiments, the other base station(s) can broadcast the wireless charging ability information. In some embodiments, the wireless charging ability information can be carried in the system information sent through broadcasting, and the terminal can obtain the wireless charging ability information from the broadcast information by receiving broadcast information from the other base station(s).

In some embodiments, the base station can send the indication information to the terminal through broadcast signaling. In some embodiments, when the terminal is in an idle state or an inactive state, the indication information can be carried in paging signaling configured to page the terminal. The base station can further send the indication information to the terminal through unicast signaling. In some embodiments, when the terminal is in a connected state, the indication information is carried through the wireless resource control signaling and sent to the terminal.

In some embodiments, the indication information is configured to instruct the terminal to measure, in response to a measurement condition being met, the wireless charging ability information of the other base station(s).

On the basis of instructing the terminal to measure the wireless charging ability of the other base station(s), the base station can further instruct the terminal to measure the wireless charging ability information of the other base station(s) only when the measurement condition is met. As a result, the flexibility of the base station in controlling of the measurement performed by the terminal can be improved. That is, the base station can configure the condition to trigger the terminal having wireless charging ability to start measuring.

In some embodiments, the measurement condition includes at least one of the following conditions where, the remaining quantity of electricity of the terminal is lower than a target quantity of electricity, the terminal is within a target area, a current time is within a target time domain resource, or a duration from a current time to a time when the terminal previously measures the wireless charging ability information of the other base station(s) is greater than a target duration.

In some embodiments, the base station can instruct the terminal, so that the terminal measures the wireless charging ability information of the other base station(s) only when the remaining quantity of electricity is lower than the target the quantity of electricity (which can be a specific quantity of electricity or a percentage corresponding to the quantity of electricity). When the terminal detects that its remaining quantity of electricity is lower than the target quantity of electricity, the terminal measures the wireless charging ability information of the other base station(s).

In some embodiments, the base station can instruct the terminal, so that the terminal measures the wireless charging ability information of the other base station(s) only when the terminal is within a target area (for example, some closed area or an area other than some closed area). The terminal can detect a relationship between its own position and a position of the target area, and measure the wireless charging ability information of the other base station(s) when it is within the target area.

In some embodiments, the base station can instruct the terminal, so that the terminal measures the wireless charging ability information of the other base station(s) only when a current time is within a target time domain resource (for example, a certain time period, or a time period other than a certain time period). In some embodiments, the target time domain resource can be a time domain resource used by the other base station(s) to broadcast the wireless charging ability information. This ensures that the terminal can measure the wireless charging ability information of the other base station(s) while the terminal is currently located in the target time domain resource, without needing to measure the wireless charging ability information when the other base station(s) do not broadcast the wireless charging ability information, so as to save resources of the terminal.

In some embodiments, the base station can instruct the terminal, so that the terminal measures the wireless charging ability information of the other base station(s) only when a duration from a current time to a time when the terminal previously measures the wireless charging ability information of the other base station(s) is greater than a target duration. The terminal can record the time when it measures the wireless charging ability information of the other base station(s) previously, for example, a time T1, and the current time is referred to as a time T0. In some embodiments, the terminal can detect the duration between T0 and T1, and measure the wireless charging ability information of the other base station(s) only when the duration is greater than the target duration. As a result, it is possible for the terminal to measure the wireless charging ability of the other base station(s) whenever the duration between T0 and T1 is greater than the target duration, so that a periodic measurement can be achieved, with a measurement period equal to or approximately equal to the target duration.

In some embodiments, the indication information is further configured to indicate a target base station that the terminal needs to measure.

On the basis of instructing the terminal to measure the wireless charging ability of the other base station(s), the base station can further indicate the other base station(s) that the terminal needs to measure, so that the terminal can only measure the target base station, without needing to measure base stations other than the target base station. In other words, the base station can configure the object that the terminal having the wireless charging ability needs to measure. For example, the base station can configure the terminal having the wireless charging ability to measure the information of neighboring base stations having the wireless charging ability. As a result, the flexibility of the base station in controlling of the measurement performed by the terminal can be improved, the resources of the terminal can be saved, and unnecessary measurements can be avoided.

In some embodiments, the indication information is further configured to instruct the terminal to report the measured wireless charging ability information.

The base station can further instruct, through the indication information, the terminal to report the wireless charging ability information of the other base station(s), which is conductive for the base station to control the reporting performed by the terminal.

In some embodiments, the indication information is configured to instruct the terminal to report, in response to a reporting condition being met, the measured wireless charging ability information.

On the basis of instructing the terminal to report the wireless charging ability of the other base station(s), the base station can further instruct the terminal, so that the terminal reports the wireless charging ability information of the other base station(s) only when the reporting condition is met. As a result, the flexibility of the base station in controlling of the reporting performed by the terminal can be improved.

In some embodiments, the reporting condition includes that in the measured wireless charging ability information, a wireless charging ability of a target type of the other base station(s) corresponding to the wireless charging ability information meets a target ability.

The terminal can obtain the wireless charging ability of the target type from the measured wireless charging ability information, and then determine whether the wireless charging ability of the target type meets the target ability. The terminal reports the wireless charging ability information of the other base station(s) only when the target ability is met.

In some embodiments, the wireless charging ability of the target type includes at least one of the wireless charging power and the wireless charging efficiency.

It should be noted that the wireless charging ability of the target type is not limited to the above two abilities, and can be determined according to needs, for example, the wireless charging ability of the target type can include the wireless charging frequency.

In some embodiments, the target ability is corresponding to the wireless charging ability of the target type. For example, if the wireless charging ability of the target type is a wireless charging power, then the target ability can be a target power, and meeting the target ability refers to being greater than or equal to the target power. For example, if the wireless charging ability of the target type is a wireless charging frequency, then the target ability can be a target frequency, and meeting the target ability refers to being greater than or equal to the target frequency.

In some embodiments, the target ability can be indicated by the base station or agreed upon between the base station and the terminal. For example, the terminal can report the wireless charging ability required by the terminal to the base station, and the base station can then determine the wireless charging ability required by the terminal as the target ability.

In some embodiments, the indication information is further configured to indicate a correlation relationship between the target ability and the remaining quantity of electricity of the terminal.

The target ability can be not fixed, but rather random changes as the remaining quantity of electricity of the terminal changes. For example, the correlation relationship between the target ability and the remaining quantity of electricity of the terminal can be positive, meaning that the lower the remaining quantity of electricity of the terminal, the lower the target ability. Therefore, when the remaining quantity of electricity of the terminal is low, the wireless charging ability of the target type only needs to meet a low target ability. The terminal can report the measured target ability information, which is conductive for the base station to select the other base station(s) for the terminal to switch in a timely manner, so as to wirelessly charge the terminal.

In some embodiments, the indication information is further configured to indicate a filtering condition based on which the terminal filters the wireless charging ability information that needs to be reported in the measured wireless charging ability information. That is, the base station can configure the content that triggers the terminal having the wireless charging ability to report the measurement.

The base station can indicate the filtering condition to the terminal through the indication information. The terminal can filter the measured wireless charging ability information based on the filtering condition, to obtain the wireless charging ability information that needs to be reported. As a result, the terminal can report the wireless charging ability information required by the base station only, which is beneficial for saving communication resources.

In some embodiments, the filtering condition includes at least one of the following conditions where the wireless charging power of the other base station(s) corresponding to the wireless charging ability information is greater than the target power, or the wireless charging efficiency of the other base station(s) corresponding to the wireless charging ability information is greater than the target efficiency.

In some embodiments, if the filtering condition includes that the wireless charging power of the other base station(s) corresponding to the wireless charging ability information is greater than the target power, the terminal can filter out from the measured wireless charging ability information the wireless charging ability information with the wireless charging power greater than the target power, and then only report the filtered wireless charging ability information. In some embodiments, if the filtering condition includes that the wireless charging efficiency of the other base station(s) corresponding to the wireless charging ability information is greater than the target efficiency, the terminal can filter out from the measured wireless charging ability information the wireless charging ability information with the wireless charging efficiency greater than the target efficiency, and then only report the filtered wireless charging ability information.

It should be noted that the filtering condition is not limited to the above two conditions, and can be determined according to needs. For example, the filtering condition can be that the wireless charging frequency of the other base station(s) corresponding to the wireless charging ability information is equal to the target frequency.

In some embodiments, the indication information is further configured to indicate to the terminal a target type of information that needs to be reported in the measured wireless charging ability information.

The base station can indicate the target type to the terminal through the indication information. The terminal can extract the wireless charging ability information being of the target type from the measured wireless charging ability information based on the target type, and only report the wireless charging ability information being of the target type, without needing to report all types of wireless charging ability information. As a result, the terminal is enabled to report the wireless charging ability information being of the type required by the base station only, which is beneficial for saving communication resources.

In some embodiments, the target type includes at least one of: an identification of the other base station(s) corresponding to the wireless charging ability information, a wireless charging power, a wireless charging time domain resource, a wireless charging frequency domain resource, and a level corresponding to the wireless charging ability information.

In some embodiments, the measured wireless charging information, for example, includes a wireless charging power, a wireless charging time domain resource, and a wireless charging frequency domain resource. If the target type includes the wireless charging power, then the terminal can only report the wireless charging power in the wireless charging information to the base station, without needing to report other contents in the wireless charging information.

In some embodiments, the base station can determine a level corresponding to the wireless charging ability information based on the measured wireless charging ability information. In some embodiments, the level can be determined based on the wireless charging power, and the wireless charging ability information with the wireless charging power within a certain power range can be determined as corresponding to one level. Since the number of levels is far less than the number of specific values of the wireless charging power, determining and reporting the level is beneficial for saving resources for reporting the wireless charging ability information.

Figure 2:
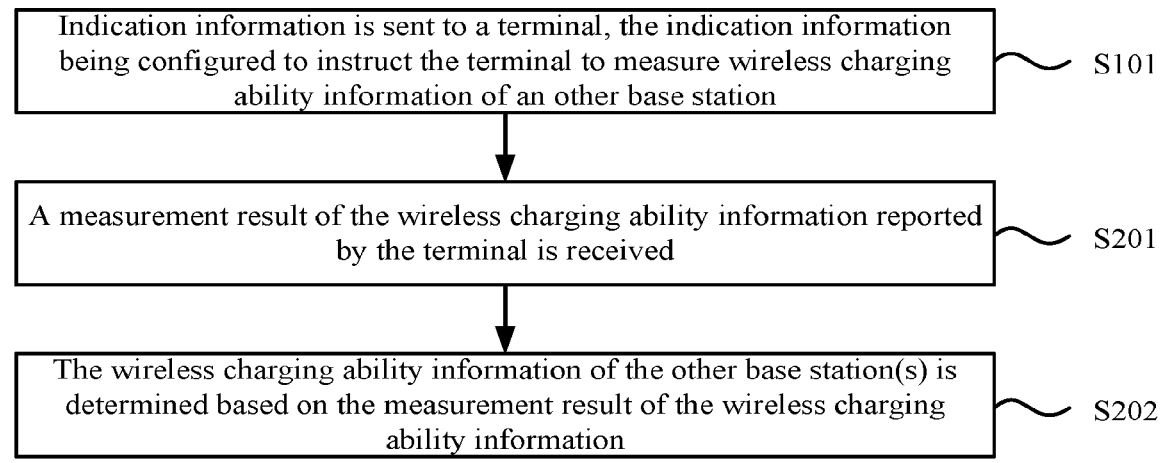
FIG. 2 is a schematic flowchart of a method for indicating a measurement according to some embodiments of the present disclosure.

FIG. 2 is a schematic flowchart of a method for indicating a measurement according to some embodiments of the present disclosure. As shown in FIG. 2, the method further includes following steps.

In step S201, a measurement result of the wireless charging ability information reported by the terminal is received.

In step S202, the wireless charging ability information of the other base station(s) is determined based on the measurement result of the wireless charging ability information.

In some embodiments, after measuring the wireless charging ability information of the other base station(s), the terminal can integrate the measured wireless charging ability information into a measurement result and report it to the base station, so that the base station can determine the wireless charging ability information of the other base station(s) based on the measurement result.

Figure 3:
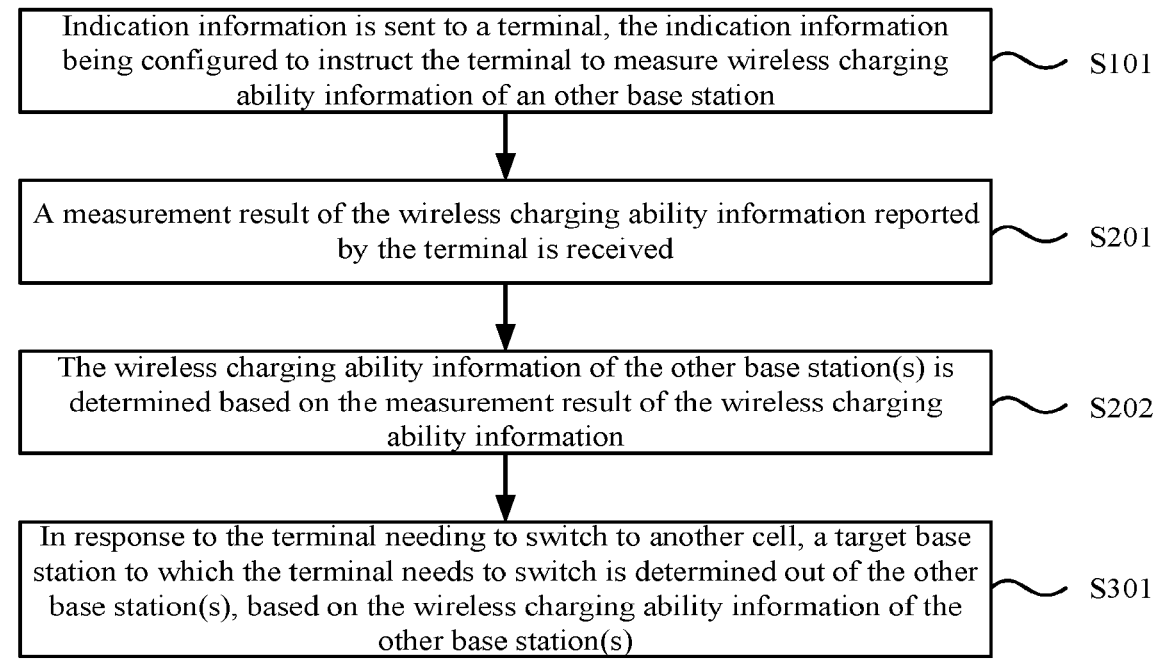
FIG. 3 is a schematic flowchart of a method for indicating a measurement according to some embodiments of the present disclosure.

FIG. 3 is a schematic flowchart of a method for indicating a measurement according to some embodiments of the present disclosure. As shown in FIG. 3, the method further includes following steps.

In step S301, in response to the terminal needing to switch to another cell, a target base station to which the terminal needs to switch is determined out of the other base station(s), based on the wireless charging ability information of the other base station(s).

In some embodiments, when determining that the terminal needs to switch to another cell, the base station can determine out of the other base station(s) a target base station (another base station corresponding to the cell to which the terminal needs to switch), based on the wireless charging ability information of the other base station(s) reported by the terminal.

In some embodiments, a base station out of the other base station(s) with the highest wireless charging power can be selected as the target base station, so that the target base station can charge the terminal as soon as possible with relatively high power. In some embodiments, a base station out of the other base station(s) with the widest wireless charging frequency band can be selected as the target base station, so that the target base station can choose an appropriate wireless charging frequency for the terminal to charge the terminal.

Figure 4:
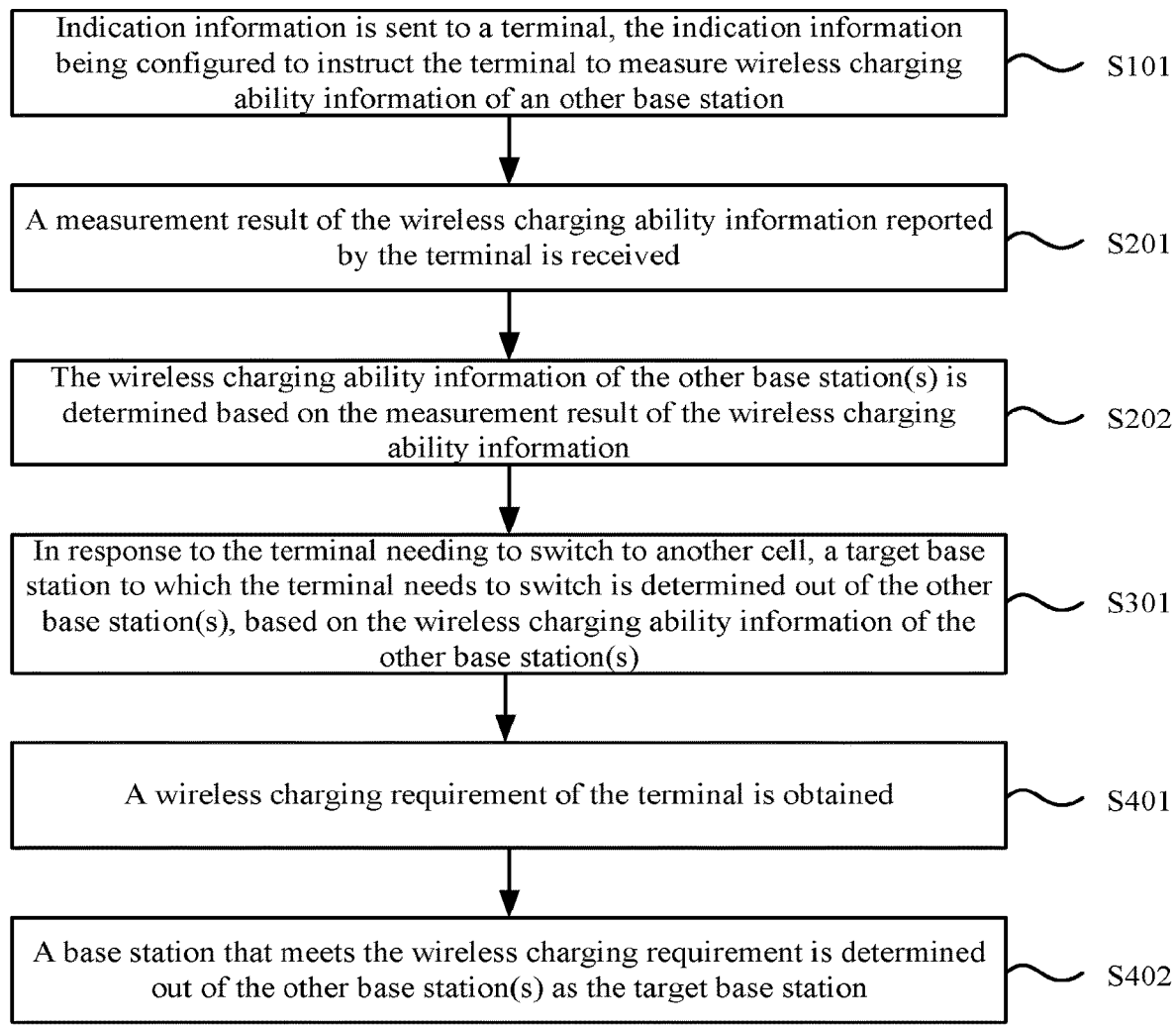
FIG. 4 is a schematic flowchart of a method for indicating a measurement according to some embodiments of the present disclosure.

FIG. 4 is a schematic flowchart of a method for indicating a measurement according to some embodiments of the present disclosure. As shown in FIG. 4, determining, based on the wireless charging ability information of the other base station(s), the target base station to which the terminal needs to switch out of the other base station(s) includes following steps.

In step S401, a wireless charging requirement of the terminal is obtained.

In step S402, a base station that meets the wireless charging requirement is determined out of the other base station(s) as the target base station.

In some embodiments, the base station can obtain the wireless charging requirement of the terminal. In some embodiments, the wireless charging requirement can be reported in the measurement result in above embodiments, in a measurement report in subsequent embodiments, or through other ways.

In some embodiments, the base station can determine out of the other base station(s) a base station that meets the wireless charging requirement of the terminal as the target base station, to ensure that after the terminal switches to the target base station, the target base station charges the terminal wirelessly, and can meet the requirement of the terminal.

In some embodiments, meeting the wireless charging requirement of the terminal can refer to the wireless charging ability of the other base station(s) meeting the wireless charging requirement of the terminal. For example, if the wireless charging requirement of the terminal includes that the charging power is greater than power P1 and the charging frequency is f1, then a base station that can provide a wireless charging signal whose power is greater than power P1 and frequency is f1 can be found out of the other base station(s), as the target base station, thereby ensuring that after the terminal switches to the target base station, the target base station can send a wireless charging signal to the terminal at frequency f1 with a power greater than power P1, so as to smoothly charge the terminal wirelessly.

Figure 5:
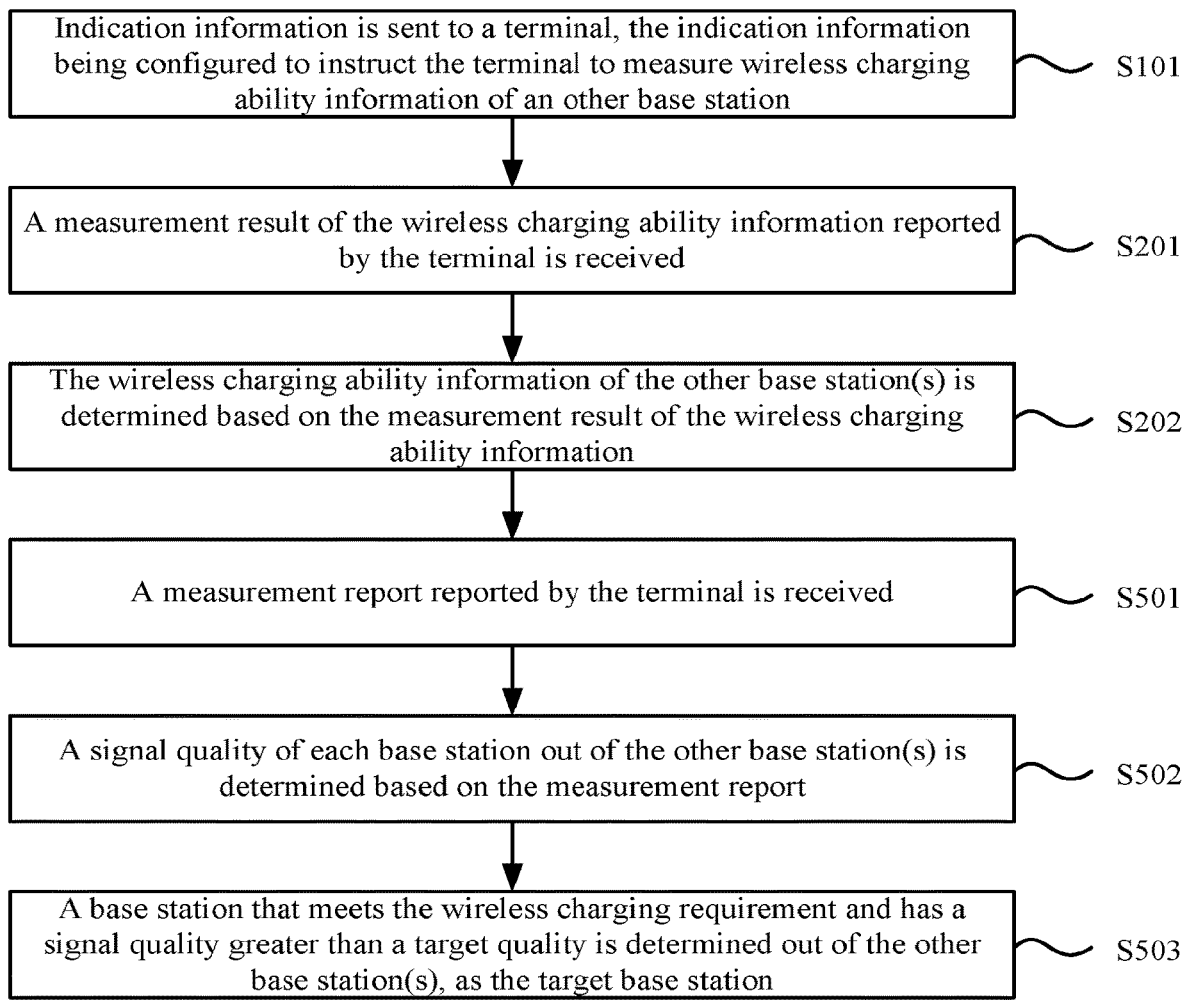
FIG. 5 is a schematic flowchart of a method for indicating a measurement according to some embodiments of the present disclosure.

FIG. 5 is a schematic flowchart of a method for indicating a measurement according to some embodiments of the present disclosure. As shown in FIG. 5, the method further includes following steps.

In step S501, a measurement report reported by the terminal is received.

In step S502, a signal quality of each base station out of the other base station(s) is determined based on the measurement report. In some embodiments, determining out of the other base station(s) a base station that meets the wireless charging requirement as the target base station includes following steps.

In step S503, a base station that meets the wireless charging requirement and has a signal quality greater than a target quality is determined out of the other base station(s), as the target base station. In some embodiments, the terminal can further measure the signal quality of the other base station(s) to generate a measurement report. The base station can determine the signal quality of the other base station(s) based on the measurement report. The signal quality can be represented through RSRP (Reference Signal Receiving Power), RSRQ (Reference Signal Receiving Quality), etc.

In some embodiments, the base station can further determine, out of the base station(s) that meet(s) the wireless charging requirement of the terminal, a base station having a signal quality greater than the target quality as the target base station. As a result, it can be ensured that after the terminal switches to the target base station, the target base station can, on the one hand, charge the terminal wirelessly in a manner that meets the requirement of the terminal, and can, on the other hand, communicate with the terminal with good communication instructions.

FIG. 6 is a schematic flowchart of a method for indicating a measurement according to some embodiments of the present disclosure. As shown in FIG. 6, the method further includes following steps.

In step S601, the wireless charging requirement of the terminal is sent to the target base station. In some embodiments, the base station can further send the wireless charging requirement of the terminal to the target base station. As a result, the target base station can provide wireless charging configuration for the terminal based on the wireless charging requirement, so that the wireless charging configuration meets the wireless charging requirement of the terminal. For example, if the wireless charging requirement includes a wireless charging frequency f2, then the frequency in the wireless charging configuration is f2. The base station can send the wireless charging configuration to the target base station, so that the terminal can receive the wireless charging signal at frequency f2 for wireless charging.

FIG. 7 is a schematic flowchart of a method for receiving an indication according to some embodiments of the present disclosure. The method for receiving the indication provided in embodiments of the present disclosure can be applied to a terminal, which can communicate with a base station as a user device, or communicate with the core network.

The terminal includes but is not limited to a communication device such as a mobile phone, a tablet, a wearable device, a sensor, an IoT device, etc. The base station includes but is not limited to a base station in the communication system such as 4G base station, 5G base station, 6G base station, etc.

As shown in FIG. 7, the method for receiving the indication can include following steps.

In step S701, indication information sent by a base station is received, the indication information being configured to instruct the terminal to measure wireless charging ability information of an other base station. In some embodiments, the base station can send the indication information to the terminal, and the terminal can determine based on the indication information that the base station needs the terminal to measure the wireless charging ability information of the other base station(s), which is conductive for the base station to control the measurement by the terminal.

In some embodiments, the other base station(s) mentioned above can include a neighboring base station of the base station, or base stations other than the neighboring base station, which can be provided according to needs. In some embodiments, the measured wireless charging ability information includes but is not limited to a wireless charging power, a frequency domain resource for wireless charging, a time domain resource for wireless charging, etc.

In some embodiments, the other base station(s) can broadcast the wireless charging ability information. In some embodiments, the wireless charging ability information can be carried in the system information sent through broadcasting, and the terminal can obtain the wireless charging ability information from the broadcast information by receiving broadcast information from the other base station(s).

In some embodiments, the base station can send the indication information to the terminal through broadcast signaling. In some embodiments, when the terminal is in an idle state or an inactive state, the indication information can be carried in paging signaling configured to page the terminal. The base station can further send the indication information to the terminal through unicast signaling. In some embodiments, when the terminal is in a connected state, the indication information is carried through the wireless resource control signaling and sent to the terminal.

In some embodiments, the indication information is configured to instruct the terminal to measure, in response to a measurement condition being met, the wireless charging ability information of the other base station(s).

Based on the indication information, the terminal can further determine that the wireless charging ability information of the other base station(s) can only be measured when the measurement condition is met. As a result, the flexibility of the base station in controlling of the measurement performed by the terminal can be improved.

In some embodiments, the measurement condition includes at least one of the following conditions where, the remaining quantity of electricity of the terminal is lower than a target quantity of electricity, the terminal is within a target area, a current time is within a target time domain resource, or a duration from a current time to a time when the terminal previously measures the wireless charging ability information of the other base station(s) is greater than a target duration.

In some embodiments, based on the indication information, the terminal can further determine to measure the wireless charging ability information of the other base station(s) only when the remaining quantity of electricity is lower than the target the quantity of electricity (which can be a specific quantity of electricity or a percentage corresponding to the quantity of electricity). When the terminal detects that its remaining quantity of electricity is lower than the target quantity of electricity, the terminal measures the wireless charging ability information of the other base station(s).

In some embodiments, based on the indication information, the terminal can further determine to measure the wireless charging ability information of the other base station(s) only when the terminal is within a target area (for example, some closed area or an area other than some closed area). The terminal can detect a relationship between its own position and a position of the target area, and measure the wireless charging ability information of the other base station(s) when it is within the target area.

In some embodiments, based on the indication information, the terminal can further determine to measure the wireless charging ability information of the other base station(s) only when a current time is within a target time domain resource (for example, a certain time period, or a time period other than a certain time period). In some embodiments, the target time domain resource can be a time domain resource used by the other base station(s) to broadcast the wireless charging ability information. This ensures that the terminal can measure the wireless charging ability information of the other base station(s) while the terminal is currently located in the target time domain resource, without needing to measure the wireless charging ability information when the other base station(s) do not broadcast the wireless charging ability information, so as to save resources of the terminal.

In some embodiments, based on the indication information, the terminal can further determine to measure the wireless charging ability information of the other base station(s) only when a duration from a current time to a time when the terminal previously measures the wireless charging ability information of the other base station(s) is greater than a target duration. The terminal can record the time when it measures the wireless charging ability information of the other base station(s) previously, for example, a time T1, and the current time is referred to as a time T0. In some embodiments, the terminal can detect the duration between T0 and T1, and measure the wireless charging ability information of the other base station(s) only when the duration is greater than the target duration. As a result, it is possible for the terminal to measure the wireless charging ability of the other base station(s) whenever the duration between T0 and T1 is greater than the target duration, so that a periodic measurement can be achieved, with a measurement period equal to or approximately equal to the target duration.

In some embodiments, the indication information is further configured to indicate a target base station that the terminal needs to measure.

Based on the indicated information, the terminal can further determine the other base station(s) that needs to be measured, so that the terminal can only measure the target base station, without needing to measure base stations other than the target base station. As a result, the flexibility of the base station in controlling of the measurement performed by the terminal can be improved, the resources of the terminal can be saved, and unnecessary measurements can be avoided.

In some embodiments, the indication information is further configured to instruct the terminal to report the measured wireless charging ability information.

Based on the indicated information, the terminal can further determine to report the wireless charging ability information of the other base station(s), which is conductive for the base station to control the reporting performed by the terminal.

In some embodiments, the indication information is configured to instruct the terminal to report, in response to a reporting condition being met, the measured wireless charging ability information.

Based on the indicated information, the terminal can further determine to report the wireless charging ability information of the other base station(s) only when the reporting condition is met. As a result, the flexibility of the base station in controlling of the reporting performed by the terminal can be improved.

In some embodiments, the reporting condition includes that in the measured wireless charging ability information, a wireless charging ability of a target type of the other base station(s) corresponding to the wireless charging ability information meets a target ability.

The terminal can obtain the wireless charging ability of the target type from the measured wireless charging ability information, and then determine whether the wireless charging ability of the target type meets the target ability. The terminal reports the wireless charging ability information of the other base station(s) only when the target ability is met.

In some embodiments, the wireless charging ability of the target type includes at least one of the wireless charging power and the wireless charging efficiency.

It should be noted that the wireless charging ability of the target type is not limited to the above two abilities, and can be determined according to needs, for example, the wireless charging ability of the target type can include the wireless charging frequency.

In some embodiments, the target ability is corresponding to the wireless charging ability of the target type. For example, if the wireless charging ability of the target type is a wireless charging power, then the target ability can be a target power, and meeting the target ability refers to being greater than or equal to the target power. For example, if the wireless charging ability of the target type is a wireless charging frequency, then the target ability can be a target frequency, and meeting the target ability refers to being greater than or equal to the target frequency.

In some embodiments, the target ability can be indicated by the base station or agreed upon between the base station and the terminal. For example, the terminal can report the wireless charging ability required by the terminal to the base station, and the base station can then determine the wireless charging ability required by the terminal as the target ability.

In some embodiments, the indication information is further configured to indicate a correlation relationship between the target ability and the remaining quantity of electricity of the terminal.

The target ability can be not fixed, but rather random changes as the remaining quantity of electricity of the terminal changes. For example, the correlation relationship between the target ability and the remaining quantity of electricity of the terminal can be positive, meaning that the lower the remaining quantity of electricity of the terminal, the lower the target ability. Therefore, when the remaining quantity of electricity of the terminal is low, the wireless charging ability of the target type only needs to meet a low target ability. The terminal can report the measured target ability information, which is conductive for the base station to select the other base station(s) for the terminal to switch in a timely manner, so as to wirelessly charge the terminal.

In some embodiments, the indication information is further configured to indicate a filtering condition based on which the terminal filters the wireless charging ability information that needs to be reported in the measured wireless charging ability information.

The terminal can further determine the filtering condition based on the indication information. The terminal can filter the measured wireless charging ability information based on the filtering condition, to obtain the wireless charging ability information that needs to be reported. As a result, the terminal can report the wireless charging ability information required by the base station only, which is beneficial for saving communication resources.

In some embodiments, the filtering condition includes at least one of the following conditions where: the wireless charging power of the other base station(s) corresponding to the wireless charging ability information is greater than the target power, or the wireless charging efficiency of the other base station(s) corresponding to the wireless charging ability information is greater than the target efficiency.

In some embodiments, if the filtering condition includes that the wireless charging power of the other base station(s) corresponding to the wireless charging ability information is greater than the target power, the terminal can filter out from the measured wireless charging ability information the wireless charging ability information with the wireless charging power greater than the target power, and then only report the filtered wireless charging ability information. In some embodiments, if the filtering condition includes that the wireless charging efficiency of the other base station(s) corresponding to the wireless charging ability information is greater than the target efficiency, the terminal can filter out from the measured wireless charging ability information the wireless charging ability information with the wireless charging efficiency greater than the target efficiency, and then only report the filtered wireless charging ability information.

It should be noted that the filtering condition is not limited to the above two conditions, and can be determined according to needs. For example, the filtering condition can be that the wireless charging frequency of the other base station(s) corresponding to the wireless charging ability information is equal to the target frequency.

In some embodiments, the indication information is further configured to indicate to the terminal a target type of information that needs to be reported in the measured wireless charging ability information.

The terminal can further determine the target type based on the indication information. The terminal can extract the wireless charging ability information being of the target type from the measured wireless charging ability information based on the target type, and only report the wireless charging ability information being of the target type, without needing to report all types of wireless charging ability information. As a result, the terminal is enabled to report the wireless charging ability information being of the type required by the base station only, which is beneficial for saving communication resources.

In some embodiments, the target type includes at least one of: an identification of the other base station(s) corresponding to the wireless charging ability information, a wireless charging power, a wireless charging time domain resource, a wireless charging frequency domain resource, and a level corresponding to the wireless charging ability information.

In some embodiments, the measured wireless charging information, for example, includes a wireless charging power, a wireless charging time domain resource, and a wireless charging frequency domain resource. If the target type includes the wireless charging power, then the terminal can only report the wireless charging power in the wireless charging information to the base station, without needing to report other contents in the wireless charging information.

In some embodiments, the base station can determine a level corresponding to the wireless charging ability information based on the measured wireless charging ability information. In some embodiments, the level can be determined based on the wireless charging power, and the wireless charging ability information with the wireless charging power within a certain power range can be determined as corresponding to one level. Since the number of levels is far less than the number of specific values of the wireless charging power, determining and reporting the level is beneficial for saving resources for reporting the wireless charging ability information.

FIG. 8 is a schematic flowchart of a method for receiving an indication according to some embodiments of the present disclosure. As shown in FIG. 8, the method further includes following steps.

In step S801, a measurement result of the wireless charging ability information of the other base station(s) is reported to the base station.

In some embodiments, after measuring the wireless charging ability information of the other base station(s), the terminal can integrate the measured wireless charging ability information into a measurement result and report it to the base station, so that the base station can determine the wireless charging ability information of the other base station(s) based on the measurement result.

Figure 9:
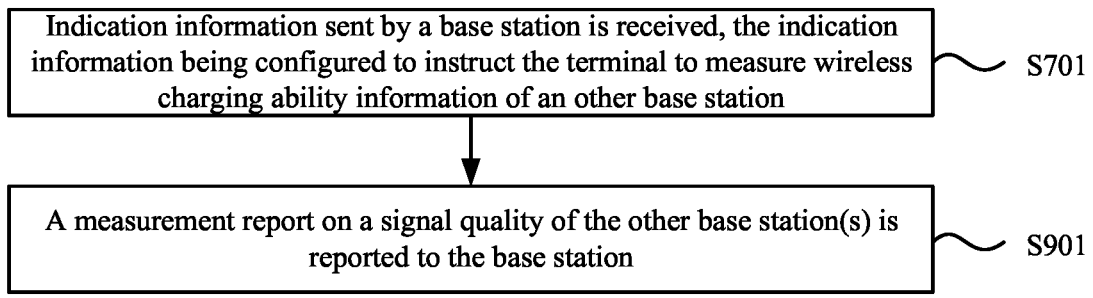
FIG. 9 is a schematic flowchart of a method for receiving an indication according to some embodiments of the present disclosure.

FIG. 9 is a schematic flowchart of a method for receiving an indication according to some embodiments of the present disclosure. As shown in FIG. 9, the method further includes following steps.

In step S901, a measurement report on a signal quality of the other base station(s) is reported to the base station.

In some embodiments, the terminal can further measure the signal quality of the other base station(s) to generate a measurement report. The base station can determine the signal quality of the other base station(s) based on the measurement report. The signal quality can be represented through RSRP, RSRQ, etc.

In some embodiments, the base station can further determine, out of the base station(s) that meet(s) the wireless charging requirement of the terminal, a base station having a signal quality greater than the target quality as the target base station. As a result, it can be ensured that after the terminal switches to the target base station, the target base station can, on the one hand, charge the terminal wirelessly in a manner that meets the requirement of the terminal, and can, on the other hand, communicate with the terminal with good communication instructions.

Embodiments of the present disclosure also provide an apparatus for indicating a measurement and an apparatus for receiving an indication, corresponding respectively to embodiments of the method for indicating a measurement and embodiments of the method for receiving an indication mentioned above.

Figure 10:
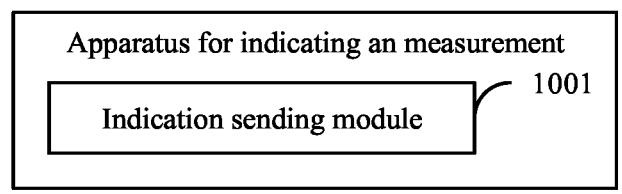
FIG. 10 is a schematic block diagram of an apparatus for indicating a measurement according to some embodiments of the present disclosure.

FIG. 10 is a schematic block diagram of an apparatus for indicating a measurement according to some embodiments of the present disclosure. The apparatus for indicating the measurement provided in embodiments of the present disclosure can be applied to a base station, which can communicate with a terminal used as a user device or communicate with a core network.

The terminal includes but is not limited to a communication device such as a mobile phone, a tablet, a wearable device, a sensor, an IoT device, etc. The base station includes but is not limited to a base station in the communication system such as 4G base station, 5G base station, 6G base station, etc.

As shown in FIG. 10, the apparatus for indicating the measurement includes an indication sending module 1001. The indication sending module 1001 is configured to send indication information to a terminal, the indication information being configured to instruct the terminal to measure wireless charging ability information of an other base station.

In some embodiments, the indication information is configured to instruct the terminal to measure, in response to a measurement condition being met, the wireless charging ability information of the other base station(s).

In some embodiments, the measurement condition includes at least one of the following: a remaining quantity of electricity of the terminal being lower than a target quantity of electricity; the terminal being within a target area; a current time being within a target time domain resource; and a duration from the current time to a time when the terminal previously measures the wireless charging ability information of the other base station(s) being greater than a target duration.

In some embodiments, the indication information is further configured to indicate a target base station that the terminal needs to measure.

In some embodiments, the indication information is further configured to instruct the terminal to report measured wireless charging ability information.

In some embodiments, the indication information is configured to instruct the terminal to report, in response to a reporting condition being met, the measured wireless charging ability information.

In some embodiments, the reporting condition includes that in the measured wireless charging ability information, a wireless charging ability of a target type of the other base station(s) corresponding to the wireless charging ability information meets a target ability.

In some embodiments, the wireless charging ability of the target type includes at least one of a wireless charging power and a wireless charging efficiency.

In some embodiments, the indication information is further configured to indicate a correlation relationship between the target ability and a remaining quantity of electricity of the terminal.

In some embodiments, the indication information is further configured to indicate to the terminal a filtering condition based on which the wireless charging ability information that needs to be reported is filtered in the measured wireless charging ability information.

In some embodiments, the filtering condition includes at least one of the following: a wireless charging power of the other base station(s) corresponding to the wireless charging ability information being greater than a target power; and a wireless charging efficiency of the other base station(s) corresponding to the wireless charging ability information being greater than a target efficiency.

In some embodiments, the indication information is further configured to indicate to the terminal a target type of information that needs to be reported in the measured wireless charging ability information.

In some embodiments, the target type includes at least one of the following: an identification of the other base station(s) corresponding to the wireless charging ability information; a wireless charging power; a wireless charging time domain resource; a wireless charging frequency domain resource; and a level corresponding to the wireless charging ability information.

Figure 11:
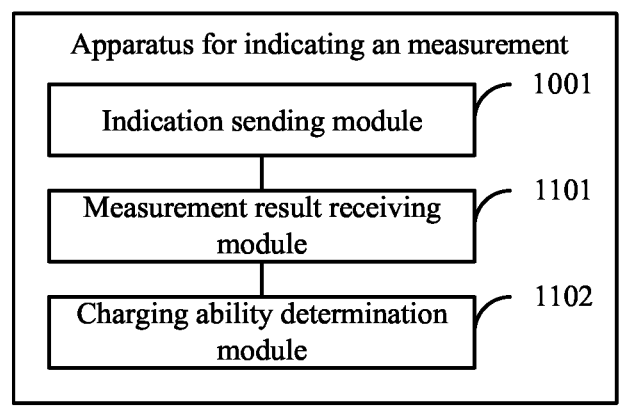
FIG. 11 is a schematic block diagram of an apparatus for indicating a measurement according to some embodiments of the present disclosure.

FIG. 11 is a schematic block diagram of an apparatus for indicating a measurement according to some embodiments of the present disclosure. As shown in FIG. 11, the apparatus further includes a measurement result receiving module 1101 and a charging ability determination module 1102.

The measurement result receiving module 1101 is configured to receive a measurement result of the wireless charging ability information reported by the terminal.

The charging ability determination module 1102 is configured to determine the wireless charging ability information of the other base station(s) based on the measurement result of the wireless charging ability information.

Figure 12:
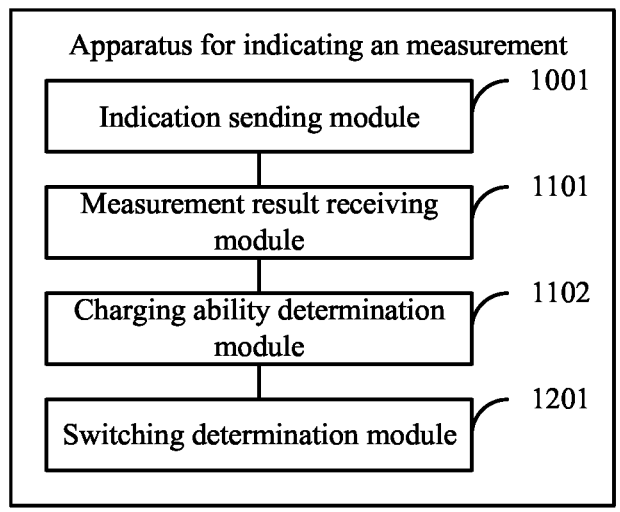
FIG. 12 is a schematic block diagram of an apparatus for indicating a measurement according to some embodiments of the present disclosure.

FIG. 12 is a schematic block diagram of an apparatus for indicating a measurement according to some embodiments of the present disclosure. As shown in FIG. 12, the apparatus further includes a switching determination module 1201.

The switching determination module 1201 is configured to determine in response to the terminal needing to switch to another cell, a target base station out of the other base station(s) based on the wireless charging ability information of the other base station(s), the target base station being a base station to which the terminal needs to switch.

In some embodiments, the switching determination module is configured to obtain a wireless charging requirement of the terminal; and determine out of the other base station(s), a base station that meets the wireless charging requirement as the target base station.

Figure 13:
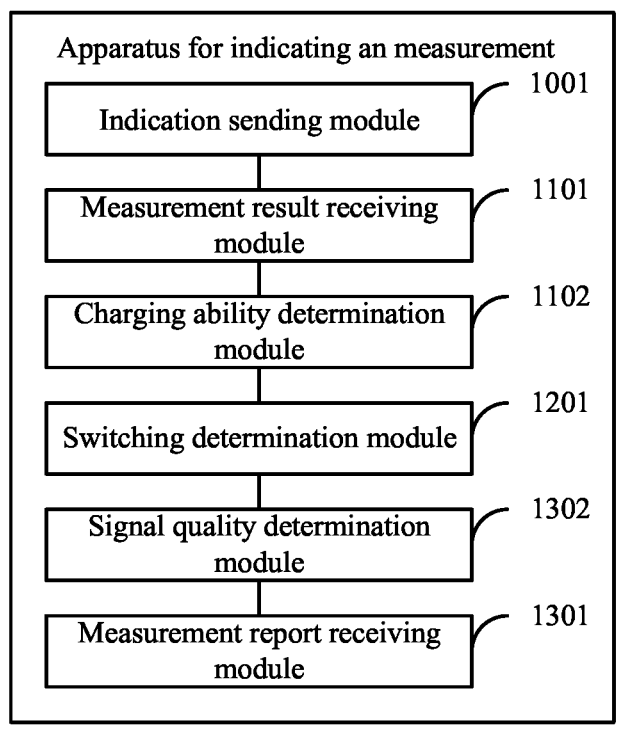
FIG. 13 is a schematic block diagram of an apparatus for indicating a measurement according to some embodiments of the present disclosure.

FIG. 13 is a schematic block diagram of an apparatus for indicating a measurement according to some embodiments of the present disclosure. As shown in FIG. 13, the apparatus further includes a measurement report receiving module 1301 and a signal quality determination module 1302.

The measurement report receiving module 1301 is configured to receive a measurement report reported by the terminal.

The signal quality determination module 1302 is configured to determine a signal quality of each base station out of the other base station(s) based on the measurement report.

In some embodiments, the switching determination module 1201 is configured to determine, out of the other base station(s), a base station that meets the wireless charging requirement and has a signal quality greater than a target quality as the target base station.

Figure 14:
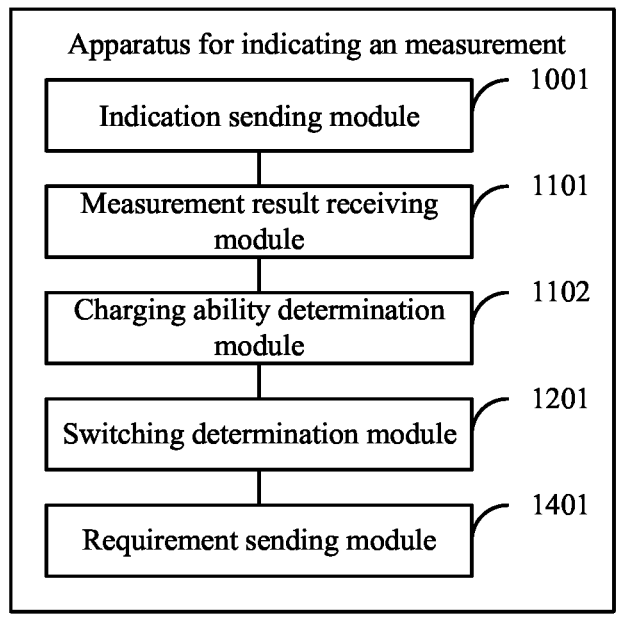
FIG. 14 is a schematic block diagram of an apparatus for indicating a measurement according to some embodiments of the present disclosure.

FIG. 14 is a schematic block diagram of an apparatus for indicating a measurement according to some embodiments of the present disclosure. As shown in FIG. 14, the apparatus further includes a requirement sending module 1401.

The requirement sending module 1401 is configured to send the wireless charging requirement of the terminal to the target base station.

Figure 15:
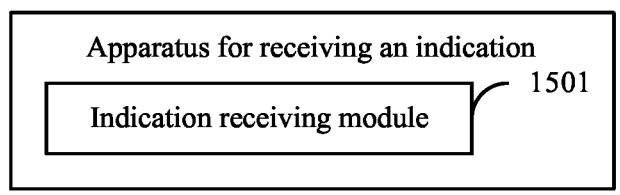
FIG. 15 is a schematic block diagram of an apparatus for receiving an indication according to some embodiments of the present disclosure.

FIG. 15 is a schematic block diagram of an apparatus for receiving an indication according to some embodiments of the present disclosure. The apparatus for receiving the indication provided in embodiments of the present disclosure can be applied to a terminal, which can communicate with a base station as a user device or communicate with a core network.

The terminal includes but is not limited to a communication device such as a mobile phone, a tablet, a wearable device, a sensor, an IoT device, etc. The base station includes but is not limited to a base station in the communication system such as 4G base station, 5G base station, 6G base station, etc.

As shown in FIG. 15, the apparatus for receiving the indication can include an indication receiving module 1501.

The indication receiving module 1501 is configured to receive indication information sent by a base station, the indication information being configured to instruct the terminal to measure wireless charging ability information of an other base station.

In some embodiments, the indication information is configured to instruct the terminal to measure, in response to a measurement condition being met, the wireless charging ability information of the other base station(s).

In some embodiments, the measurement condition includes at least one of the following: a remaining quantity of electricity of the terminal being lower than a target quantity of electricity; the terminal being within a target area; a current time being within a target time domain resource; and a duration from the current time to a time when the terminal previously measures the wireless charging ability information of the other base station(s) being greater than a target duration.

In some embodiments, the indication information is further configured to indicate a target base station that the terminal needs to measure.

In some embodiments, the indication information is further configured to instruct the terminal to report measured wireless charging ability information.

In some embodiments, the indication information is configured to instruct the terminal to report, in response to a reporting condition being met, the measured wireless charging ability information.

In some embodiments, the reporting condition includes that in the measured wireless charging ability information, a wireless charging ability of a target type of the other base station(s) corresponding to the wireless charging ability information meets a target ability.

In some embodiments, the wireless charging ability of the target type includes at least one of a wireless charging power and a wireless charging efficiency.

In some embodiments, the indication information is further configured to indicate a correlation relationship between the target ability and a remaining quantity of electricity of the terminal.

In some embodiments, the indication information is further configured to indicate to the terminal a filtering condition based on which the wireless charging ability information that needs to be reported is filtered in the measured wireless charging ability information.

In some embodiments, the filtering condition includes at least one of the following: a wireless charging power of the other base station(s) corresponding to the wireless charging ability information being greater than a target power; and a wireless charging efficiency of the other base station(s) corresponding to the wireless charging ability information being greater than a target efficiency.

In some embodiments, the indication information is further configured to indicate to the terminal a target type of information that needs to be reported in the measured wireless charging ability information.

In some embodiments, the target type includes at least one of the following: an identification of the other base station(s) corresponding to the wireless charging ability information; a wireless charging power; a wireless charging time domain resource; a wireless charging frequency domain resource; and a level corresponding to the wireless charging ability information.

Figure 16:
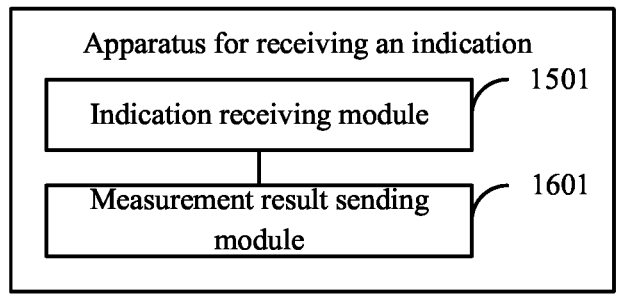
FIG. 16 is a schematic block diagram of an apparatus for receiving an indication according to some embodiments of the present disclosure.

FIG. 16 is a schematic block diagram of an apparatus for receiving an indication according to some embodiments of the present disclosure. As shown in FIG. 16, the apparatus further includes a measurement result sending module 1601.

The measurement result sending module 1601 is configured to report a measurement result of the wireless charging ability information of the other base station(s) to the base station.

Figure 17:
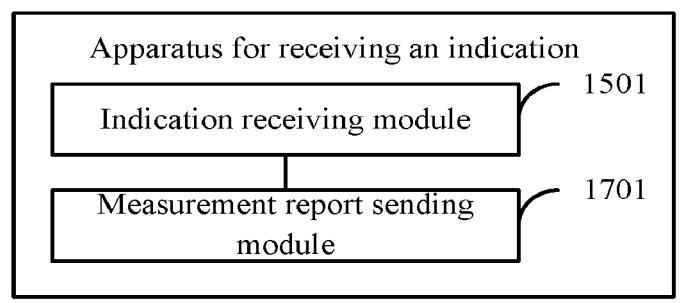
FIG. 17 is a schematic block diagram of an apparatus for receiving an indication according to some embodiments of the present disclosure.

FIG. 17 is a schematic block diagram of an apparatus for receiving an indication according to some embodiments of the present disclosure. As shown in FIG. 17, the apparatus further includes a measurement report sending module 1701.

The measurement report sending module 1701 is configured to report a measurement report on a signal quality of the other base station(s) to the base station.

As for the apparatus in the above embodiments, specific ways in which each module performs the function has been described in detail in the method embodiments, which will not be described in detail here.

For apparatus embodiments, since they basically correspond to method embodiments, reference can be made to the explanations of method embodiments for relevant information. The apparatus embodiments described above are only illustrative, where the units described as separate components may be or may not be physically separated, and the components displayed as units may be or may not be physical units. That is, the units can be located in one place or distributed across multiple network units. Some or all modules can be selected according to actual needs to achieve the purpose of the solutions of the present disclosure. Those skilled in the art can understand and implement that without creative efforts.

Embodiments of the present disclosure also provide a communication device.

The communication device includes a processor and a memory. The memory is configured to store a computer program. In some embodiments, when the computer program is executed by the processor, the method for indicating the measurement described in any of the above embodiments is implemented.

Embodiments of the present disclosure also provide a communication device.

The communication device includes a processor and a memory. The memory is configured to store a computer program. In some embodiments, when the computer program is executed by the processor, the method for receiving the indication described in any of the above embodiments is implemented.

Embodiments of the present disclosure also provide a computer-readable storage medium for storing a computer program, and when the computer program is executed by a processor, the method for indicating the measurement described in any of the above embodiments is implemented.

Embodiments of the present disclosure also provide a computer-readable storage medium for storing a computer program, and when the computer program is executed by a processor, the method for receiving the indication described in any of the above embodiments is implemented.

Figure 18:
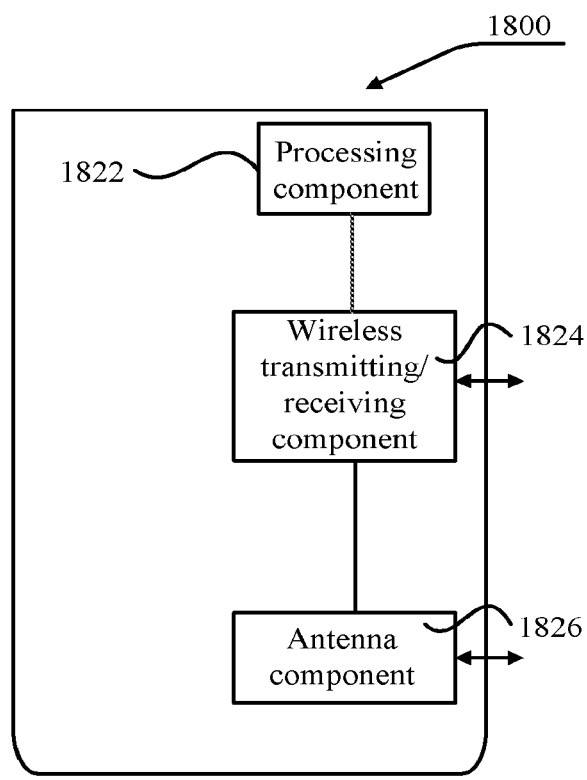
FIG. 18 is a schematic block diagram of a device for indicating a measurement according to some embodiments of the present disclosure.

As shown in FIG. 18, FIG. 18 is a schematic block diagram of a device for indicating a measurement according to some embodiments of the present disclosure. The device 1800 can be provided as a base station. Referring to FIG. 18, the device 1800 includes a processing component 1822, a wireless transmitting/receiving component 1824, an antenna component 1826, and a signal processing part dedicated to a wireless interface. The processing component 1822 can further include one or more processors. One of the processors in the processing component 1822 can be configured to implement the method for indicating the measurement described in any of the above embodiments.

Figure 19:
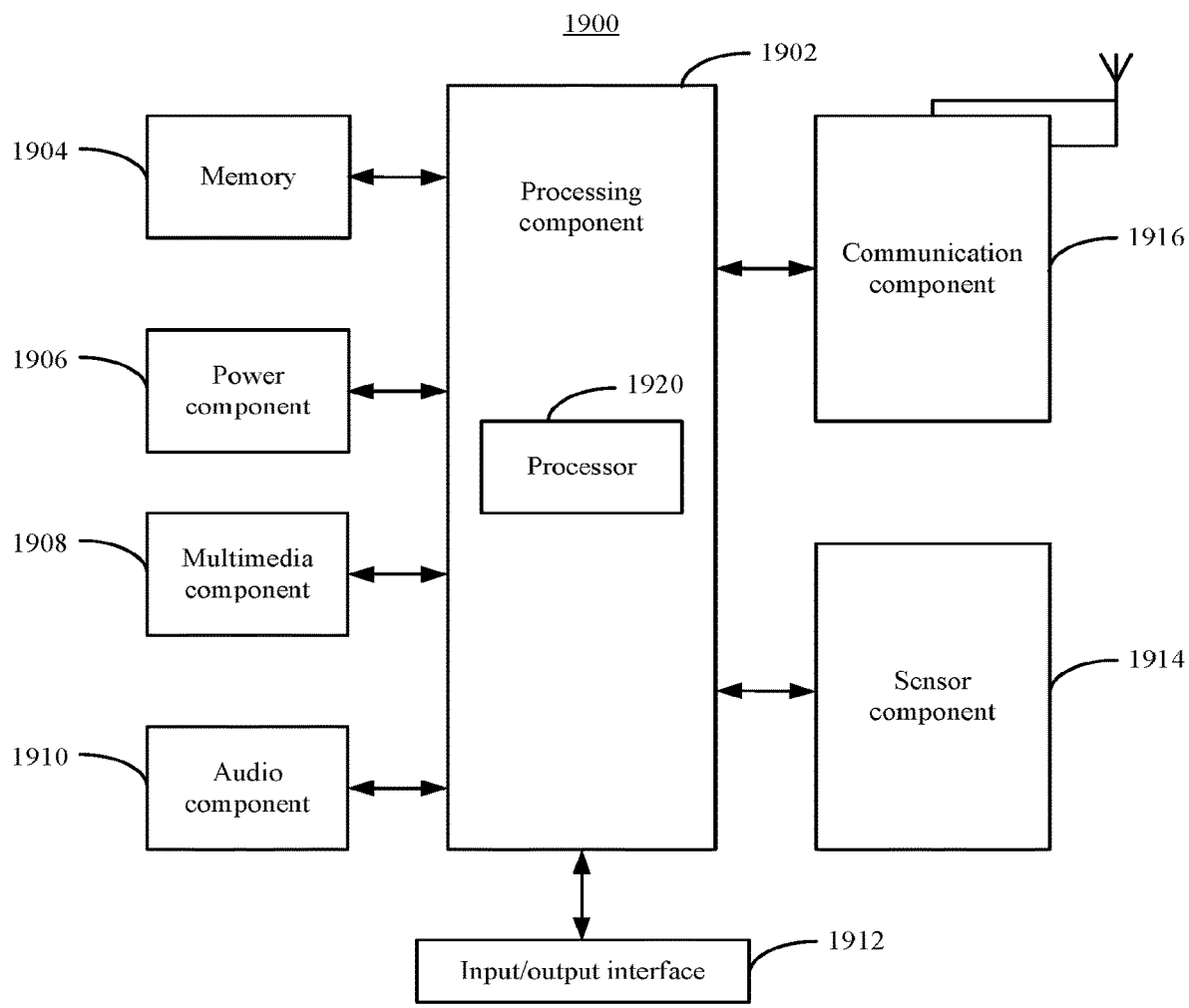
FIG. 19 is a schematic block diagram of a device for receiving an indication according to some embodiments of the present disclosure.

FIG. 19 is a schematic block diagram of a device for receiving an indication according to some embodiments of the present disclosure. For example, the device 1900 can be a mobile phone, a computer, a digital broadcasting terminal, a messaging device, a game console, a tablet device, a medical device, a fitness device, a personal digital assistant, etc.

Referring to FIG. 19, the device 1900 may include one or more of the following components: a processing component 1902, a memory 1904, a power component 1906, a multimedia component 1908, an audio component 1910, an input/output (I/O) interface 1912, a sensor component 1914, and a communication component 1916.

The processing component 1902 typically controls the overall operation of the device 1900, such as operations associated with display, telephone call, data communication, camera operation, and recording operations. The processing component 1902 may include one or more processors to execute instructions to complete all or part of the methods described above. In addition, the processing component 1902 may include one or more modules to facilitate interactions between the processing component 1902 and other components. For example, the processing component 1902 may include a multimedia module to facilitate interaction between the multimedia component 1908 and the processing component 1902.

The memory 1904 is configured to store various types of data to support operations in the device 1900. Examples of such data include instructions, contact data, phone book data, messages, pictures, videos, and the like for any application or method operating on the device 1900. The memory 1904 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 1906 provides power for various components of the device 1900. The power component 1906 may include a power management system, one or more power supplies, and other components associated with generating, managing, and distributing power for the device 1900.

The multimedia component 1908 includes a display screen providing an output interface between the device 1900 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 1908 includes a front camera and/or a rear camera. When the device 1900 is in operation mode, such as shooting mode or video mode, the front camera and/or rear camera can receive external multimedia data. Each front camera and rear camera can be a fixed optical lens system or have focal length and optical zoom capability.

The audio component 1910 is configured to output and/or input audio signals. For example, the audio component 1910 includes a microphone (MIC), which is configured to receive an external audio signal when the device 1900 is in an operation mode, such as a calling mode, a recording mode, and a voice recognition mode. The received audio signal may be further stored in memory 1904 or transmitted via communication component 1916. In some embodiments, the audio component 1910 also includes a speaker for outputting audio signals.

The I/O interface 1912 provides an interface between the processing component 1902 and peripheral interface modules, which can be a keyboard, click wheel, button, etc. These buttons may include, but are not limited to, the Home button, Volume button, Start button, and Lock button.

The sensor component 1914 includes one or more sensors for providing various aspects of condition evaluation for the device 1900. For example, the sensor component 1914 can detect an open/closed state of the device 1900, relative positioning of the components. The component is, for example, a display and a keypad of the device 1900. The sensor component 1914 can also detect changes in the position of the device 1900 or one component of the device 1900, presence or absence of the user's contact with the device 1900, orientation or acceleration/deceleration of the device 1900 and temperature change of the device 1900. The sensor component 1914 may include a proximity sensor configured to detect the presence of nearby objects without any physical contact. The sensor component 1914 may also include a light sensor, such as a CMOS or CCD image sensor, for use in imaging applications. In some embodiments, the sensor component 1914 may also include an acceleration sensor, a gyroscope sensor, a magnetic sensor, a pressure sensor, or a temperature sensor.

The communication component 1916 is configured to facilitate wired or wireless communication between the device 1900 and other devices. The device 1900 can access wireless networks based on any communication standards, such as WiFi, 2G, 3G, 4G LTE, 5G NR, or a combination thereof. In some embodiments, the communication component 1916 receives a broadcast signal or broadcast related information from an external broadcast management system via a broadcast channel. In some embodiments, the communication component 1916 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In some embodiments, the device 1900 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for implementing above methods for indicating the measurement.

In embodiments of the present disclosure, a non-transitory computer-readable storage medium is also provided, such as a memory 1904 including instructions, which can be executed by the processor 1920 of the device 1900 to implement the above methods for indicating the measurement. For example, the non-transitory computer-readable storage medium can be ROM, random access memory (RAM), CD-ROM, tapes, floppy disks, optical data storage devices, etc.

After considering the specification and practices of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

It should be understood that the present disclosure is not limited to the precise structure described above and shown in the drawings, and various modifications and changes can be made without departing from its scope. The scope of the present disclosure is limited only by the appended claims.

It should be noted that relational terms such as "first" and "second" herein are only used to distinguish one entity or operation from another entity or operation, and do not necessarily require or imply any actual relationship or order between these entities or operations. Terms "include", "comprise", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including a . . . " do not exclude the existence of other identical elements in the process, method, item, or device that includes the elements.

The above provides a detailed introduction to the methods and devices provided by embodiments of the present disclosure. Specific examples are applied herein to explain the principles and implementation methods of the present disclosure. The explanations of the above embodiments are only used to help understand the methods and inventive ideas of the present disclosure. For those of ordinary skill in the art, there may be changes in the specific implementation methods and application scopes based on the ideas of the present disclosure. In summary, the content of this specification should not be understood as a limitation of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A method for indicating a measurement, performed by a first base station, comprising:
    sending indication information to a terminal, wherein the indication information is configured to instruct the terminal to measure wireless charging ability of at least one second base station; and
    wherein the indication information comprises a measurement condition, and the indication information is further configured to instruct the terminal to determine whether the measurement condition is met, and to measure the wireless charging ability of the at least one second base station in the case that the measurement condition is met.

2. The method according to claim 1, wherein the measurement condition comprises at least one of:
    a remaining quantity of electricity of the terminal being lower than a target quantity of electricity;
    the terminal being within a target area;
    a current time being within a target time domain resource; or
    a duration from the current time to a time when the terminal previously measures the wireless charging ability of the at least one second base station being greater than a target duration.

3. The method according to claim 1, wherein the indication information is further configured to indicate a target base station that the terminal needs to measure.

4. The method according to claim 1, wherein the indication information is further configured to instruct the terminal to report measured wireless charging ability.

5. The method according to claim 4, wherein the indication information is further configured to instruct the terminal to report, in response to a reporting condition being met, the measured wireless charging ability.

6. The method according to claim 5, wherein the reporting condition comprises that in the measured wireless charging ability, a wireless charging ability of a target type of the at least one second base station corresponding to the measured wireless charging ability meets a target ability.

7. The method according to claim 6, wherein the wireless charging ability of the target type comprises at least one of a wireless charging power and a wireless charging efficiency.

8. The method according to claim 6, wherein the indication information is further configured to indicate a correlation relationship between the target ability and a remaining quantity of electricity of the terminal.

9. The method according to claim 4, wherein the indication information is further configured to indicate to the terminal a filtering condition based on which the wireless charging ability that needs to be reported is filtered in the measured wireless charging ability.

10. The method according to claim 9, wherein the filtering condition comprises at least one of:
a wireless charging power of the at least one second base station corresponding to the measured wireless charging ability being greater than a target power; or
a wireless charging efficiency of the at least one second base station corresponding to the measured wireless charging ability being greater than a target efficiency.

11. The method according to claim 4, wherein the indication information is further configured to indicate to the terminal a target type of information that needs to be reported in the measured wireless charging ability.

12. The method according to claim 11, wherein the target type comprises at least one of:
an identification of the at least one second base station corresponding to the measured wireless charging ability;
a wireless charging power;
a wireless charging time domain resource;
a wireless charging frequency domain resource; or
a level corresponding to the measured wireless charging ability.

13. The method according to claim 1, further comprising:
receiving a measurement result of the wireless charging ability reported by the terminal; and
determining wireless charging ability information of the at least one second base station based on the measurement result of the wireless charging ability.

14. The method according to claim 13, further comprising:
determining, in response to the terminal needing to switch to another cell, a target base station out of the at least one second base station based on the wireless charging ability information of the at least one second base station, wherein the target base station is a base station corresponding to the cell to which the terminal needs to switch.

15. The method according to claim 14, wherein determining the target base station out of the at least one second base station based on the wireless charging ability information of the at least one second base station comprises:
obtaining a wireless charging requirement of the terminal; and
determining, out of the at least one second base station, a base station that meets the wireless charging requirement as the target base station.

16. The method according to claim 15, further comprising:
receiving a measurement report reported by the terminal; and
determining a signal quality of each base station out of the at least one second base station based on the measurement report; and
wherein determining, out of the at least one second base station, a base station that meets the wireless charging requirement as the target base station comprises:
determining, out of the at least one second base station, a base station that meets the wireless charging requirement and has a signal quality greater than a target quality as the target base station.

17. The method according to claim 15, further comprising:
sending the wireless charging requirement of the terminal to the target base station.

18. A method for receiving an indication, performed by a terminal, comprising:
receiving indication information sent by a first base station, wherein the indication information comprises a measurement condition, and is configured to instruct the terminal to measure wireless charging ability of at least one second base station;
determining whether the measurement condition is met; and
measuring the wireless charging ability of the at least one second base station in the case that the measurement condition is met.

19. A communication device, comprising:
a processor; and
a memory for storing a computer program executable by the processor;
wherein the processor is configured to:
send indication information to a terminal, wherein the indication information is configured to instruct the terminal to measure wireless charging ability of at least one second base station; and
wherein the indication information comprises a measurement condition, and the indication information is further configured to instruct the terminal to determine whether the measurement condition is met, and to measure the wireless charging ability of the at least one second base station in the case that the measurement condition is met.

* * * * *